(12) United States Patent
Riley, Jr.

(10) Patent No.: US 8,333,032 B1
(45) Date of Patent: Dec. 18, 2012

(54) ENCASEMENT DEVICES AND METHODS FOR PLANTING MANGROVES

(76) Inventor: Robert W. Riley, Jr., Melbourne Beach, FL (US)

( * ) Notice: Subject to any disclaimer, the term of this patent is extended or adjusted under 35 U.S.C. 154(b) by 0 days.

(21) Appl. No.: 13/452,173

(22) Filed: Apr. 20, 2012

Related U.S. Application Data

(62) Division of application No. 12/397,023, filed on Mar. 3, 2009, now Pat. No. 8,181,386.

(60) Provisional application No. 61/036,269, filed on Mar. 13, 2008.

(51) Int. Cl.
*A01G 13/02* (2006.01)

(52) U.S. Cl. ............... 47/29.2; 47/29.1; 47/29.7; 47/30

(58) Field of Classification Search .................. 47/29.2, 47/20.1, 23.1, 23.2, 24.1, 29.1, 29.3, 29.4, 47/29.6, 29.7, 30, 31.1, 32.3, 32.4, 32.5, 47/32.6; D8/1
See application file for complete search history.

(56) References Cited

U.S. PATENT DOCUMENTS

| | | | |
|---|---|---|---|
| 3,826,040 | A | 7/1974 | Roberts |
| 4,829,707 | A | 5/1989 | Koffler |
| 4,845,889 | A | 7/1989 | Taylor |
| 5,263,278 | A | 11/1993 | Valenti |
| 5,509,229 | A | 4/1996 | Thomasson |
| 5,615,517 | A | 4/1997 | Smith |
| 5,809,689 | A | 9/1998 | Mathur |
| 5,813,170 | A | 9/1998 | Friesner |
| 6,357,172 | B1 | 3/2002 | Risgaard |
| 6,481,155 | B1 | 11/2002 | Bugler |
| 2005/0102892 | A1 | 5/2005 | Jones |
| 2006/0032122 | A1 | 2/2006 | Chang |
| 2010/0299993 | A1 | 12/2010 | Lais |

OTHER PUBLICATIONS

Ayer, Seedlings Thrive with Experimental Mangrove Method, News-Press.com, Fort Myer, Florida, Southwest, Florida, Sponsored by: TOPICALIA Every Sunda, The News-Press, 2008, 2 pages.

Riley, Encased Replanting a Red Mangrove Replenishment Methodology, Proceedings of the 22nd Annual Conference on Ecosystems Restoration and Creation, Hillsborough Community College Institute of Florida Studies, 1995, pp. 165-178.

Riley, The Riley Encased Methodology for Establishing Mangroves, Forest Management, Land and Water, 1999, pp. 48-49.

Riley, Riley Encased Methodology: Principles and Processes of Mangrove Habitat Creation and Restoration, Mangroves and Salt Marshes, Kluwer Academic Publishers, Printed in the Netherlands, 1999, pp. 207-213, vol. 207-213.

Rothenberger, Utilisation of Encasement Technology in Restoration of Mangrove Forest on St. Croix, U.S. Virgin Islands, ReefREsearch, 1999, 4 pages, vol. 9, No. 3.

Salgado Kent, A Comparison of Riley Encased Methodology and Traditional Techniques for Planting Red Mangroves (*Rhizophora mangle*), Mangroves and Salt Marshes, Kluwer Academic Publishers, 1999, p. 215, vol. 3.

Sato, A Novel Approach to Growing Mangroves on the Coastal Mud Flats of Eritrea with the Potential for Relieving Regional Poverty and Hunger, The Society of Wetland Scientists, 2005, pp. 776-779, vol. 25, No. 3.

Martinez, Experimental Techniques of Red Mangrove (*Rhizophora mangle*) Reforestation in Southwestern, Puerto Rico, Paper, 2006, 5 pages.

*Primary Examiner* — T. Nguyen
(74) *Attorney, Agent, or Firm* — Brian S. Steinberger; Law Offices of Brian S. Steinberger, P.A.

(57) ABSTRACT

Cylindrical encasement devices and methods for planting mangrove propagules or seedlings along shorelines and non-native environments. The devices can use interior (or exterior) longitudinal grooves or thinned channels or lines of holes that hinge the device along the longitudinal axis to facilitate increases in displacement which results in acceleration of plant development and adaptation, improving survivability and reproductive maturity to establish self-sustaining mangrove trees and forests. A manufacturing enables control of the structure, color and opacity, to facilitate applications in habitat creation, restoration, shoreline stabilization, erosion control, and environmental remediation. Safe and easy removal of the device from the environment occurs without harm and damage.

14 Claims, 8 Drawing Sheets

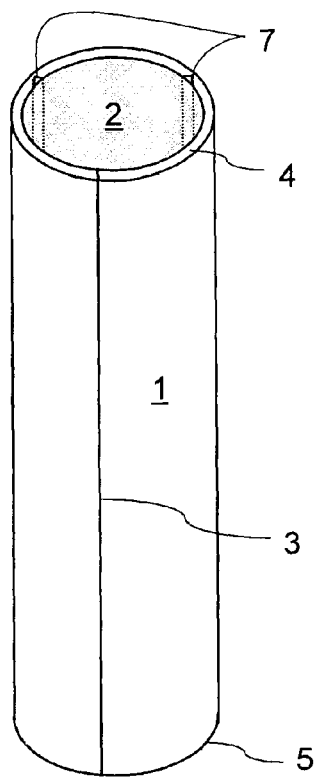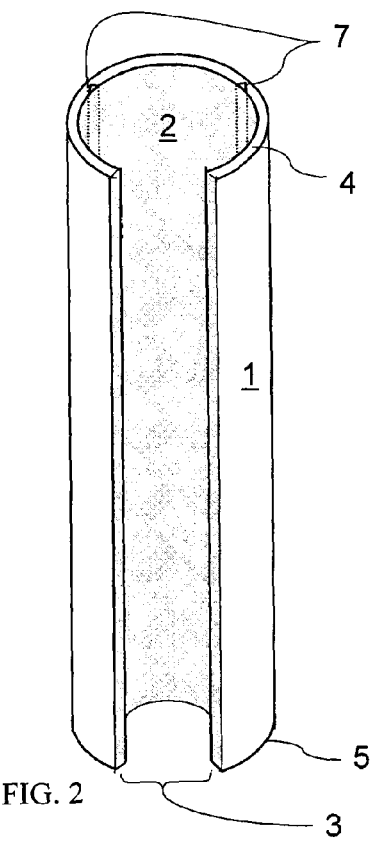
FIG. 1
FIG. 2

ENCASEMENT DEVICES AND METHODS FOR PLANTING MANGROVES

CROSS REFERENCE TO RELATED APPLICATIONS

This invention is a Divisional Application of U.S. patent application Ser. No. 12/397,023 filed Mar. 3, 2009 now U.S. Pat. No. 8,181,386, now allowed, which claims the benefit of priority to U.S. Provisional Patent Application Ser. No. 61/036,269 filed Mar. 13, 2008.

FIELD OF INVENTION

This invention relates to water plants, in particular to encasement devices, and methods for planting mangrove plants.

BACKGROUND AND PRIOR ART

It has been historically difficult for Mangrove re-vegetation or planting of mangroves in non-native environments or areas where habitats have been destroyed or topography and hydrology has changed. Numerous techniques for planting mangroves have been attempted and described in scientific and popular literature. For example, standard 1.5" inch PVC (polyvinyl chloride) pipes have been used over the years that meet American Society for Testing and Materials standards (ASTM-2241) have been used over the years for planting mangroves.

Various publications and references have discussed the attributes of using PVC pipes. See for example, "A red mangrove replenishment methodology", Riley, R. W., Jr. In: Webb, F. J. and Cannizzaro, P. J. (eds), Proceedings of the 22nd Annual Conference on Ecosystems Restoration and Creation, pp. 132-161. 1995. Hillsborough Community College, Tampa, Fla.; "Riley encased methodology: principles and processes of mangrove habitat creation and restoration", Robert W. Riley, Jr & Chandra Salgado Kent, Mangroves and Salt Marshes 3: 207-213, Kluwer Academic Publishers, December 19991 Web site created on May 19, 1996, URL=mangrove.org. See also, U.S. Pat. Nos. 4,829,707 to Koffler and 5,263,278 to Valenti, Jr. and U.S. Published Patent Application 2006/0032122 to Chang. However, these PVC pipes and other similar devices have specific deficiencies, which the subject invention remedies or significantly improves.

A deficiency of the prior art is that the structure and configuration limit the rate of plant development and correspondingly the rate of the adaptation process. As the propagule or seedling planted inside the cylindrical encasement device develops and begins the adaptation process, the cross-sectional area of the plant increases and expands exerting force against the interior walls of the fixed diameter pipes and thereby opening the device and affecting an increase in displacement. As the developing tree increases the displacement of the cylindrical encasement device, progressively greater force is required against the interior walls for each incremental increase in displacement.

The force required to affect an incremental increase in the displacement increases geometrically in direct relationship to the displacement of the device; or alternatively stated, the force required to affect each increment increase in displacement increases geometrically with the total displacement of the device. This direct relationship between the increase in force required to affect each incremental increase and the total displacement of the cylindrical encasement device, limits the rate of plant development and the rate of the adaptation process.

Another disadvantage of known devices is the white colored pigmentation in ASTM 2241 PVC material and the resulting high opacity that restricts the ambient light reaching the seedling through the cylindrical encasement device walls. The white pigmentation also tends to restrict those portions of the spectrum that promote photosynthesis and the growth of plants. Additionally, low ambient light level that results from the white pigmentation slows the rate of the plant development process.

Still further shortcomings of known devices include the inability to the remove the device from the environment following completion of the adaptation process or when the tree becoming self-supporting.

Additionally, many of the known devices do not permit modifications of pigmentation, opacity and color. Nor do these devices enable control of the intensity and spectrum of radiation, including visible and ultraviolet light, reaching the propagule or seedling through the body wall of the device.

Thus, for at least these reasons the need exists for solutions to the above problems with the prior art.

SUMMARY OF THE INVENTION

A primary objective of the present invention is to provide a new and improved cylindrical type of encasement device for planting mangroves that combines a longitudinal slit with at least one longitudinal groove along an internal wall generally opposite that longitudinal slit.

A secondary objective of the present invention is to provide a new and improved cylindrical type encasement device for planting mangroves, which can be efficiently manufactured, marketed and distributed.

A third objective of the present invention is to provide a new and improved cylindrical type encasement device which is durable and cost-effective with repeatability to easily be manufactured.

A fourth objective of the present invention is to provide a new and improved cylindrical type encasement device which enables low cost of manufacture with regard to both materials and labor, and thereby making such mangrove planting encasement devices economically available to a wide range of planting applications.

The development of the novel encasement device for planting mangroves enables reliable and long-term establishment of reproductively mature, self-sustaining mangroves and mangrove forests along high-energy shorelines, seawalls, revetments, bulkheads, in non-native environments and environments where natural recruitment cannot occur. The invention has particular applicability in areas destroyed or degraded, or where topography and hydrology has been artificially changed, such that physical conditions are no longer favorable for natural mangrove recruitment. The invention provides a new and improved encasement device for mangrove afforestation, habitat creation, restoration, shoreline stabilization and erosion control.

By planting propagules or seedlings within the novel encasement devices, the plants are isolated from harsh external environment factors and an artificial environment is created inside the cylindrical encasement device favorable to early plant development.

The encased plants are protected from damage by wrack, debris, wind, wave activity; herbivory and unintentional damage from human interaction as-well-as other anthropogenic factors.

From inside the encasement devices the propagule or seedling can mature through its natural stages of development, begins the adaptation process that the juvenile tree experiences when habituating to the external non-native or high-energy environment. The cylindrical encasement device enables forced adaptation, that is, induced changes in morphology or structure of the tree that are a result of the subject invention's design and the positioning of both the device and seedlings according to elevation and tidal regimes. Based on the inherent critical function of the novel encasement device in the planting of mangroves, and the deficiencies in the other known devices, the subject invention claims significant innovation and improvements.

The subject invention incorporates an innovative design and manufacture that provides the advantages inherent in the other known devices but none of the deficiencies. The new cylindrical encasement device improves reliability in establishing reproductively mature, self-sustaining mangroves and mangrove forests.

Additionally, the novel invention enables modification of the constituents and specifications of the device, including material, pigmentation, wall thickness, diameter, and the number, size and shape of longitudinal grooves, which enables the device to be optimized, based on species, environmental conditions, bottom sediments, tidal regimes, latitude, anthropogenic and site specific factors.

The cylindrical type encasement device can be constructed from a variety of materials, including plastics, biodegradable plastics, other man-made or natural materials. The device can be configured as a single member or in multiple vertical body sections. A significant functional innovation of the subject invention is that the novel invention achieves an inverse relationship between the force required to affect an incremental increase in displacement and the total displacement of the cylindrical encasement device.

This inverse relationship is achieved with the invention of longitudinal grooves or thinned channels located in the interior and/or exterior walls of the device. The longitudinal grooves or thinned channels can be cut into the internal body walls with a laser, heat cutter, machine tool, router, table saw or other cutting tools. Longitudinal grooves or thinned channels include sequentially drilled holes or sequential cuts along the longitudinal axis of the cylindrical encasement device in order to perform the equivalent function. Longitudinal grooves or thinned channels can be manufactured into the cylindrical encasement device by extrusion-thru-mold or other manufacturing process.

The longitudinal grooves or thinned channels can be any geometric shape including but not limited to triangular, rectangular, semi-circular, irregular or any curve. As the propagule or seedling planted with subject invention goes through its natural stages of development, the cross-sectional area of the plant increases and expands exerting force against the cylindrical encasement device interior walls and as a result opens the device at the longitudinal slit or at one or more of the longitudinal grooves or thinned channels, which are fractured by the developing tree, and thereby move the walls of the device outward in a lateral plane affecting an increase in displacement of the cylindrical encasement device.

The longitudinal grooves or thinned channels function as stress points that result in progressive fatigue in the device walls and weaken the cylindrical encasement device structure with each incremental increase in displacement. The weakening of the device structure at the longitudinal grooves or thinned channels functions to hinge the device along the longitudinal axis and reduce the force required to affect each incremental increase in displacement. The total displacement of the cylindrical encasement device is incremented by increases in cross-sectional area of the plant, progressively less force is required against the interior walls for each incremental increase in displacement of the device.

The inverse relationship can be achieved by the decrease in force required to affect each incremental increase in displacement of the cylindrical encasement device. The encasement with expandable walls (grooves in the walls) accelerates the rate of the adaptation process and establishment of self-supporting mangrove trees by enabling the seedling to develop and habituate to the external environment at an accelerated rate.

The novel encasement device provides significant advantages vis-à-vis the other known devices, including:

A. Acceleration of plant development: The inverse relationship achieved by the subject invention between the forces required to affect an incremental increase in displacement and the total displacement of the cylindrical encasement device, results in a greater displacement of the device corresponding to earlier stages of plant development. The increase in displacement of the device enables the developing plant to extend its root system into surrounding sediments and obtain necessary nutrients and moisture required for plant growth and development, which results in shorter time periods to achieve the natural stages of plant development and an accelerated rate of plant growth.

B. Facilitation of a self-regulated adaptation process: The acceleration of plant development enables the tree to quickly establish a well developed subterranean as-well-as aerial root system that anchors and stabilizes the tree. As the cross-sectional area of the plant increases, the total displacement of the cylindrical encasement device increases and the tree subsequently exceeds the volumetric capacity of cylindrical encasement device fracturing or splitting the body of the device along the longitudinal grooves or thinned channels allowing the seedling unrestricted growth. As a result, the device separates along the longitudinal grooves or thinned channels into detached longitudinal segments. At this point, the tree becomes independent of the cylindrical encasement device and is self-supporting; the tree has completed the adaptation process.

C. Shortened duration time to complete the adaptation process: Because the novel cylindrical encasement device facilitates plant development and enables the mangrove to extend its root system into surrounding sediments and obtain additional nutrients and moisture required for growth and development, the subject invention accelerates growth and the rate at which the tree matures, thereby shortening the time required for habituation of the tree to the external environment and completion of the adaptation process.

D. Shortened duration time to achieve reproductive maturity and establish aerial roots: Based on the new cylindrical encasement device features that accelerate plant development and the adaptation process, the time required for the tree to reach reproductive maturity and establish aerial roots has been significantly shortened.

E. Improved yield rate: The function of the new cylindrical encasement device in accelerating plant growth enables seedlings to survive inclement weather events and result in a higher survival rate. The manufacturing process of the preferred embodiment of the subject invention enables control of the color and opacity as-well-as the intensity and spectrum of solar radiation, including visible and ultraviolet light, reaching the plant through the body wall of the encasement device and therefore, improves long-term yield rate of the plants.

F. Improved long-term survivability: A preferred embodiment of the novel cylindrical encasement enables the device to be optimized, based on species, environmental conditions, bottom sediments, tidal regimes, latitude, anthropogenic and site specific factors, which promote plant health and resistance to disease or damage from environmental factors and ultimately improve long-term survivability.

G. The subject cylindrical encasement device functions as a temporary structure: A feature of the new cylindrical encasement device whereby the body wall fractures or separates along the longitudinal grooves or thinned channels separating the encasement body into multiple semi-circular longitudinal segments as the plant matures and becomes self-supporting enables the cylindrical encasement device be removed from the environment at the completion of the adaptation process without damage to the tree.

F. Forced adaptation: The subject invention enables induced changes in morphology or structure in order to habituate the developing mangrove tree to non-native environment or environments where natural recruitment cannot occur. Based on propagule or seedling selection and positioning of the cylindrical encasement device as to elevation as-well-as tidal regimes and positioning of the seedling within the cylindrical encasement device through the adjustments of the sediment fill in order to establish the planting elevation of the propagule or seedling relative to NGVD, mean high water and seasonal high water, changes in morphology and structure can be induced to facilitate the adaptation process. This enables the planting of mangroves at extreme negative elevations, in non-native environments and along high-energy shorelines, seawalls, revetments and bulkheads where natural recruitment cannot occur and conventional planting methods are ineffective.

For example, the increase in displacement of the cylindrical encasement device causes expulsion of the sediment used to establish the artificial bottom at the planting elevation and creates a modified root structure that that is critical for successful completion of the adaptation process. As the cross-sectional area of the plant increases and expands exerting force against the encasement interior walls and opening the encasement at the longitudinal slit or at the longitudinal grooves or thinned channels and thereby moving the walls of the encasement outward in a lateral plane affecting an increase in displacement of the encasement, sediment used to establish the seedling planting elevation is discharged from the cylindrical encasement device. The roots previously covered with sediment fill within the cylindrical encasement device become exposed.

The root tissue, which was subterranean prior to sediment discharge, is strengthened and becomes rigid, capable of supporting the seedling as a freestanding plant. The morphology of the roots become stem like and it is this structural or morphological change that provides a means for habituating the tree at negative elevations.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective view of a preferred embodiment of an encasement device with internal longitudinal grooves in a closed position along longitudinal slit.

FIG. 2 is a perspective view of the encasement device of FIG. 1 in an open position along the longitudinal slit and hinged at longitudinal grooves to increase displacement.

DESCRIPTION OF THE PREFERRED EMBODIMENTS

Figure 3:
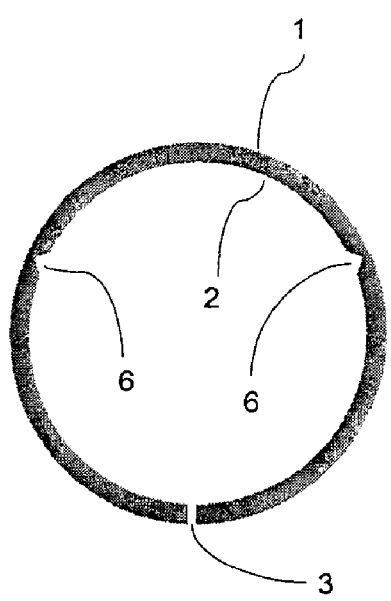
FIG. 3 is a cross-sectional view of the closed encasement device of FIG. 1.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. A listing of the components in the figures will now be described.

1. Encasement Device
2. Interior walls
3. Longitudinal Slit
4. Top edge
5. Bottom edge.
6. Slit Edges
7. interior longitudinal grooves/thinned channels
9. Side wall openings for drainage and/or root migration
11. Embankment
13. Seedling
14. Mean highwater and planting elevation
15. Encasement device portion
16. Natural lagoon or estuary bottom sediments
17. Encasement device
18. Root system The subject invention is directed toward a generally cylindrical type encasement device for planting mangroves in the inter-tidal or littoral zone of oceans, lagoons and bays for the purpose of a forestation, habitat creation and restoration, shoreline stabilization and erosion control. The invention includes the planting and positioning of mangroves within a cylindrical type encasement device that isolates the propagules or seedlings in a controlled environment. This environment is favorable to early plant development, which promotes the adaptation process and the establishment of reproductively mature, self-sustaining mangrove trees and forests. The invention is concerned with a plurality of cylindrical type encasement device structures for planting mangroves, which are positioned, inserted or tamped into the bottom sediments of lagoons, estuaries, bays, and seas within the Littoral zone, and in non-native environments or environments where natural recruitment cannot occur.

FIG. 1 is a perspective view of an embodiment of the encasement device 1 with top edge 4 and bottom edge 5 with longitudinal grooves or thinned channels 7 located therebetween along the interior wall 2 of the cylindrical encasement device 1 and a longitudinal slit 3 running between the top edge and the bottom edge. Although not shown the longitudinal grooves or thinned channels can also be located in the internal wall and/or the exterior wall of the cylindrical encasement device. Also not shown are sequentially drilled holes or sequential cuts can be located along the longitudinal axis of the cylindrical encasement device in order to perform the equivalent function of longitudinal grooves or thinned channels.

FIG. 2 is a perspective view of the subject cylindrical encasement device 1 opening at the longitudinal slit 3 and hinged at the longitudinal grooves or thinned channels 7 to facilitate an increase in displacement of the device.

Referring to FIGS. 1-2 the encasement device of the subject invention can include a body formed in a cylindrical shape 1, which the cross-section can be any curve, having a longitudinal slit 3 directed through the body wall and oriented parallel to body axis with one or more longitudinal grooves or thinned channels 7 located in the interior or exterior surface of the body wall and spaced apart. In a preferred embodiment the longitudinal grooves or thinned channels 7 are located in the interior body wall 2 spaced apart and radically displaced approximately 120+ degrees.

FIG. 3 shows a cross-sectional view of the encasement device of FIG. 1 showing the longitudinal grooves or thinned channels 7. The longitudinal grooves or thinned channels 7 can have a generally triangular shape with apex into the body wall. Another embodiment can include a rectangular shape. Another embodiment can include other geometrical shapes such as but not limited to concave curved, semi-circular irregular or any curve, and the like. Other groove shapes can include an oval shape. The groove shape can be configured to keep the integrity of the encasement device as it is opening so as to limit fracturing a separation. The invention can use a combination of different groove shapes. For example, one groove shape can be triangular while one or more can be convex curved, so that the triangular shape will tend to fracture and/or split before the concave curved shape.

Figure 4:
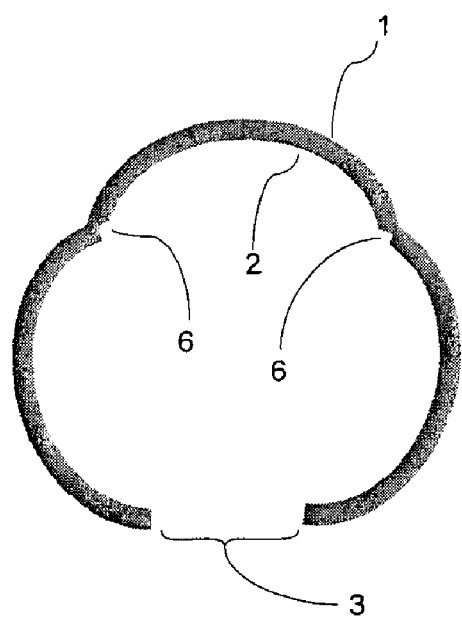
FIG. 4 is a cross-sectional view of the open encasement device of FIG. 2.

FIG. 4 is a view showing the cross-sectional view of the open encasement device of FIG. 2 opening at the longitudinal slit 3 and hinged at the longitudinal grooves or thinned channels 7 to facilitate an increase in displacement of the device. A view showing a cross-section of the cylindrical encasement device with an increase in displacement FIG. 4 as it would appear as the propagule or seedling planted inside the encasement goes through its natural stages of development. As the cross-sectional area of the plant increases and expands, it thereby is exerting force against the encasement interior walls 2 and opening the encasement at the longitudinal slit 3 and moving the walls of the device outward in a lateral plane affecting an increase in displacement of the encasement device.

As displacement of the cylindrical encasement device 1 increases, the longitudinal grooves or thinned channels 7 experience fatigue that results in weakening of the encasement's cylindrical structure along the longitudinal grooves or thinned channels creating a hinge along the longitudinal axis of the cylindrical encasement device that facilitates lateral movement of the body segments and enabling a commensurate increase in the displacement of the encasement device with the progressive increase in the cross-sectional area of the developing tree.

Figure 5:
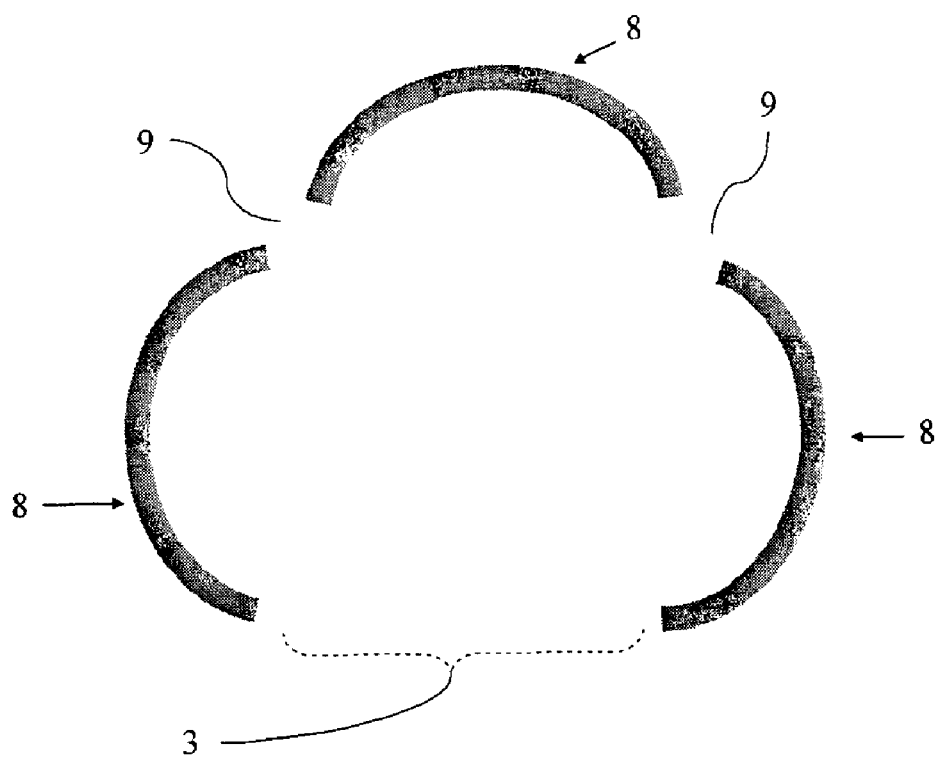
FIG. 5 is another top view of the open encasement device of FIG. 1 with opening of the device at the longitudinal slit and fracture/splitting along longitudinal grooves resulting in increased displacement and separation into semi-circular longitudinal segments.

FIG. 5 is a cross-sectional view of the subject cylindrical encasement 1 with opening of the device at the longitudinal slit 3 and fracture or splitting of the encasement body 9 along the longitudinal grooves or thinned channels resulting in increased displacement and separation of the device into semi-circular longitudinal segments 8. As the seedling continues through its natural stages of development the cross-sectional area of the tree expands exerting force against the encasement interior walls 2 opening the device 1 at the longitudinal slit 3. The expanding tree subsequently exceeds the volumetric capacity of cylindrical encasement device fracturing the body along the longitudinal grooves or thinned channels and the resulting separation 9 into longitudinal segments 8.

At the point when the cylindrical encasement device fractures, the tree has completed the adaptation process and habituated to the external environment, has become self-supporting and independent of the cylindrical encasement device. The fracture and separation at the longitudinal grooves or thinned channels 7 enables the cylindrical encasement device to be removed from the environment by physically extracting the longitudinal segments 8 from the sediment without damage to the tree.

Figure 6:
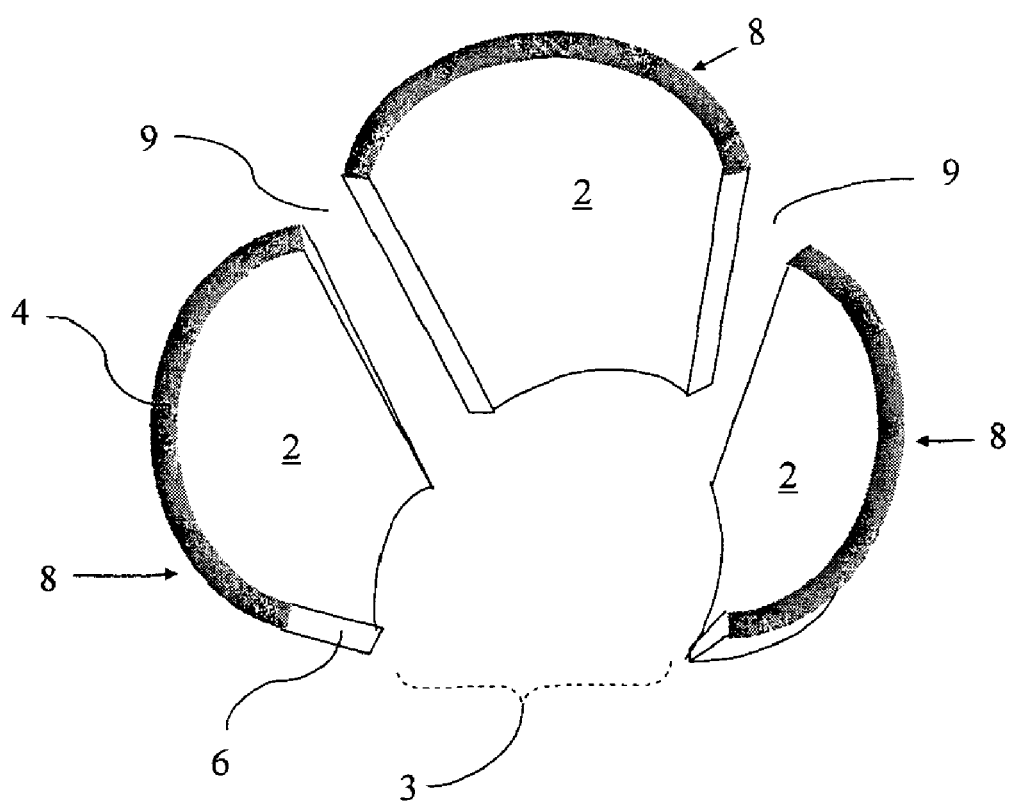
FIG. 6 is a perspective view of the top of encasement device of FIG. 5 opening at the longitudinal slit and fracture/splitting along longitudinal grooves resulting in increased displacement and separation into semi-circular longitudinal segments.

FIG. 6 is a perspective view of the subject cylindrical encasement device interior body walls 2 with an opening of the device 1 at the longitudinal slit 3 and fracture or splitting of the encasement body 9 along the longitudinal grooves or thinned channels resulting in increased displacement and separation of the device into semi-circular longitudinal segments 8. The separation of the device into semi-circular longitudinal segments 8 enables the removal of the device from the environment without damage to the tree. The subject cylindrical encasement device with increased displacement results in opening of the longitudinal slit 3 and separates the slit edges 6 and fracture of the encasement body 9 along the longitudinal grooves or thinned channels and into separate longitudinal segments 8.

Figure 7:
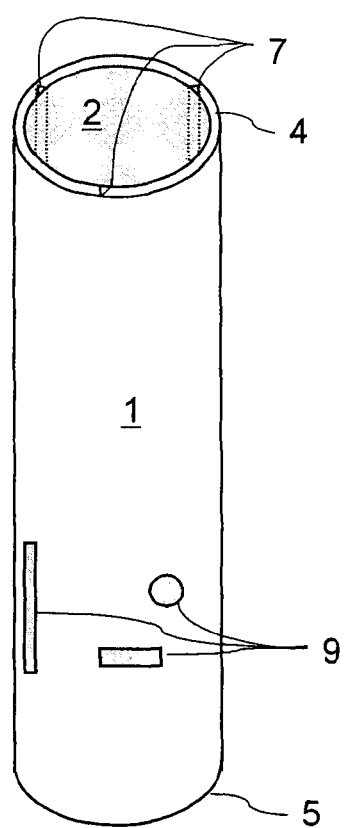
FIG. 7 is a perspective view of another embodiment of the encasement device with interior longitudinal grooves and shaped side openings for drainage and/or root migration.

FIG. 7 is a perspective view showing an alternative embodiment of the subject cylindrical encasement device 1, top edge 4 and bottom edge 5, and interior body wall 2 with longitudinal grooves or thinned channels 7, with no longitudinal split. The sidewalls show examples of various shaped optional openings 9 in the encasement body for drainage and/or root migration.

Figure 8:
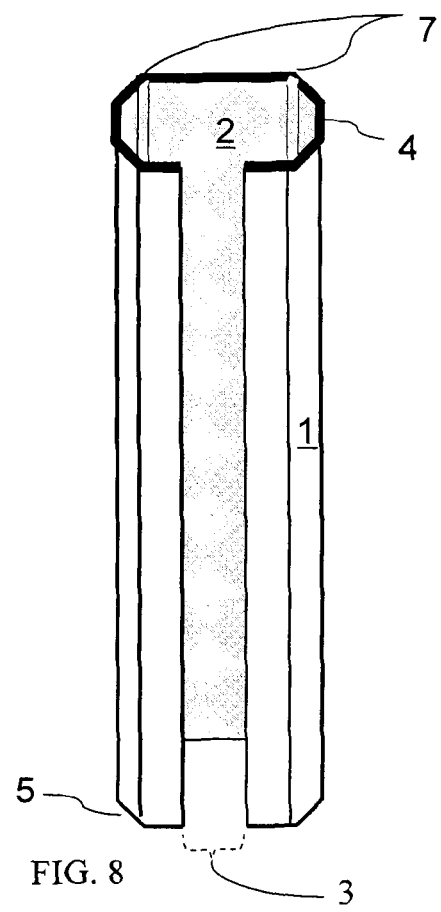
FIG. 8 is a perspective view of another embodiment of the encasement device with non-curved side walls.

FIG. 8 is a perspective view showing a shape of the subject cylindrical encasement device 1, with top edge 4 and bottom edge 5. The cross-section can be any curve, and interior body wall 2 with longitudinal grooves or thinned channels 7 and longitudinal slit 3, such as having flat sidewalls, and the like. This embodiment can include longitudinal grooves or thinned channels 7 and shows increased displacement and opening along the longitudinal slit 3.

Figure 9:
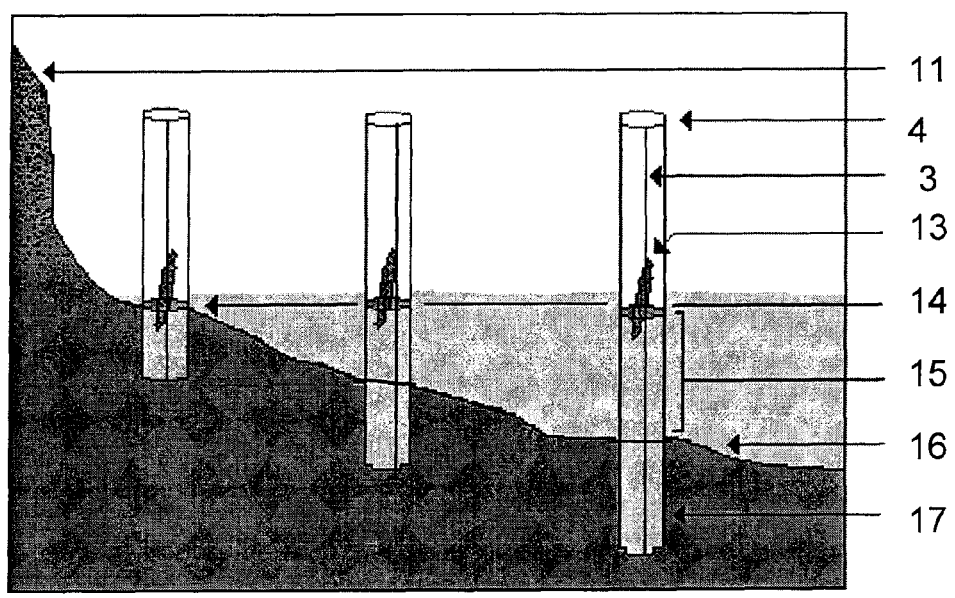
FIG. 9 shows a shoreline planting application of plural encasement devices.

FIG. 9 shows the subject invention in a shoreline planting application with the top edge of the cylindrical encasement device 4 with the longitudinal slit 3 and seedling 13 within the cylindrical encasement device. As shown in FIG. 9, this reference elevations mean-high water 14, which is the preferred propagule or seedling planting elevation 14. The embankment 11, portion of the cylindrical encasement device 17 is tamped or inserted into the bottom sediments 16 to anchor and stabilize the cylindrical encasement device in position. The planted propagules or seedlings 13 set on the sediment fill or artificial bottom within the cylindrical encasement device 15 is to establish the planting elevation of each individual propagule or seedling at approximately mean-high water 14. An artificial bottom or sediment fill 15 within the cylindrical encasement device is to establish preferred elevation and enable forced adaptation.

Figure 10:
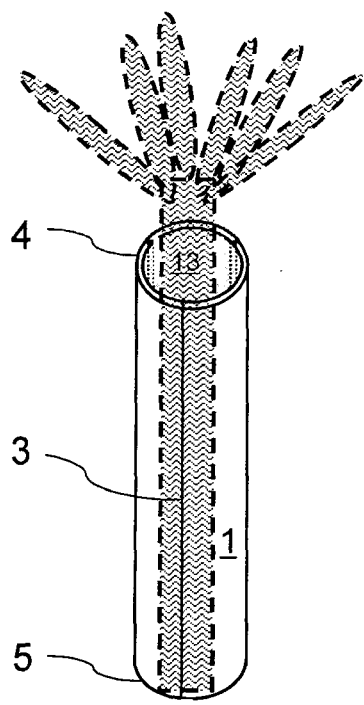
FIG. 10 is a perspective view of the encasement device 1 with a developing plant.

FIG. 10 is a perspective view showing the subject cylindrical encasement device 1 with the outline of a developing plant 13, the top edge 4 and bottom edge 5, longitudinal slit 3 and longitudinal grooves or thinned channels 7. In FIG. 10, the developing seedling 13 begins to fill the initial displacement of the encasement.

Figure 11:
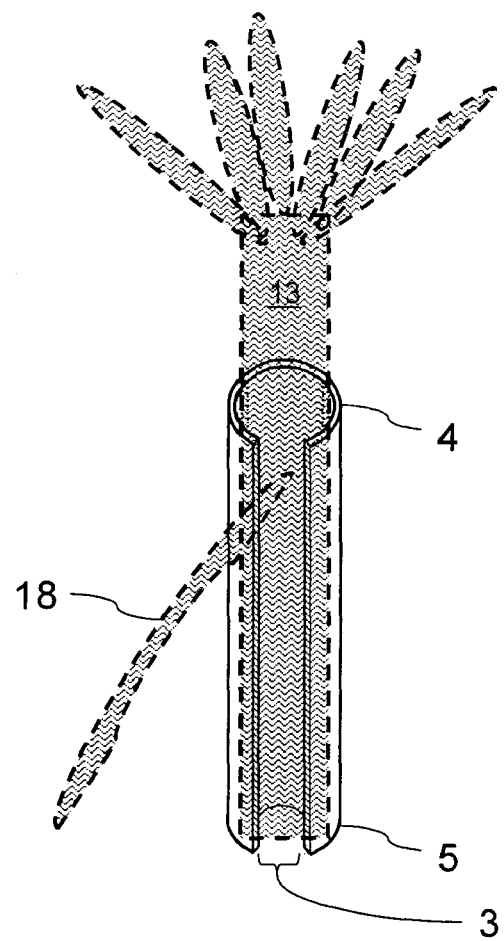
FIG. 11 is a perspective view of the encasement device of FIG. 10 with opening at the longitudinal slit and an increase in displacement with the developing plant undergoing the adaptation process extending the root system to the external environment.

FIG. 11 shows a perspective view of FIG. 10 of the encasement device with opening at the longitudinal slit 3, the top edge 4 and bottom edge 5, and an increase in displacement with the outline of a developing plant undergoing the adaptation process extending the root system 18 to the external environment. As the tree develops the longitudinal slit opens 3 and the developing tree extends the root system 18 outside the cylindrical encasement device 1 into the external environment. The root extension 18 characterizes intermediate stages of the adaptation process.

Figure 12:
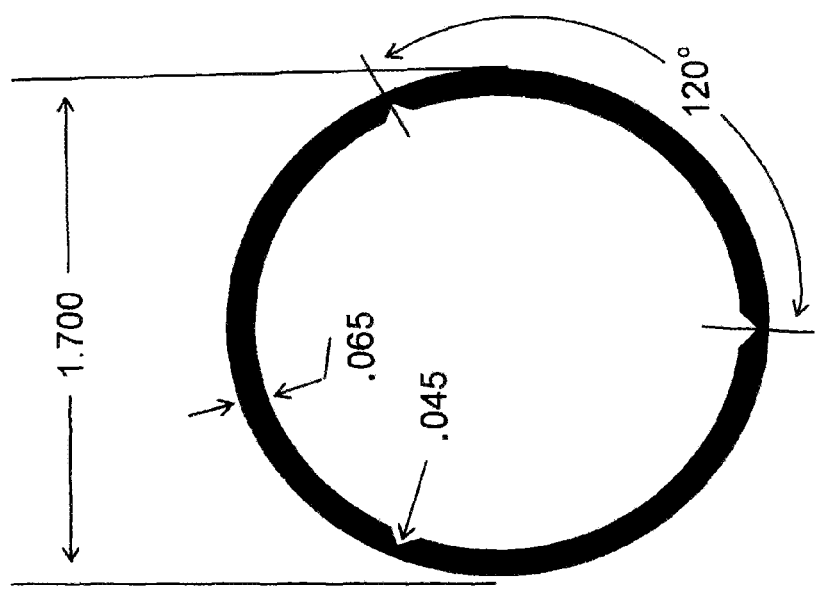
FIG. 12 is a cross-sectional view of one of the encasement devices with internal longitudinal grooves.

FIG. 12 shows a cross-sectional view of one of the molds used in the extrusion-through-mold process of manufacturing the preferred embodiment. The dimensions shown are for exhibit purposes and can vary depending on site-specific factors, species planted, materials and other factors.

Table 1 describes PVC encasement material specifications. Preferably the Rigid Grade Range lists the preferable ranges for Hardness, Shore D; Tensile Strength, Yield; Flexural Modulus; Flexural Strength; and Izod Impact, Notched. The listed ranges encompass PVC encasements that have been successfully tested under hurricane conditions in the last few years.

TABLE 1

| PVC Encasement Material Specifications | | | |
|---|---|---|---|
| | Rigid Grade Range | REM | Standard |
| Physical Properties | | | |
| Specific Gravity | 0.0419-0.0553 lb/inÂ³ | 0.0499 lb/inÂ³ | ASTM D-792 |
| Mechanical Properties | | | |
| Hardness, Shore D | 76.0-83.0 | 79 | ASTM D-2240 |
| Tensile Strength, Yield | 4500-7980 psi | 6500 psi | ASTM D-638 |
| Flexural Modulus | 331-429 ksi | 400 ksi | ASTM D-790 |
| Flexural Strength | 9300-13000 psi | 12500 psi | ASTM D-790 |
| Izod Impact, Notched | 1.31-23.2 ft-lb/in | 20.0 ft-lb/in | ASTM D-256 |

Table 2 lists various encasement wall thicknesses along with optimized groove depths. Other encasement sizes can be used as well.

TABLE 2

| # | OD | ID | Wall Thickness | Groove Depth | Min Wall Thickness | Groove Depth/Wall Thickness |
|---|---|---|---|---|---|---|
| 1 | 2.400 | 2.140 | 0.130 | 0.065 | 0.065 | 50% |
| 2 | 1.900 | 1.720 | 0.090 | 0.045 | 0.045 | 50% |
| 3 | 1.900 | 1.720 | 0.090 | 0.035 | 0.055 | 40% |
| 4 | 1.700 | 1.500 | 0.100 | 0.050 | 0.050 | 50% |
| 5 | 1.700 | 1.570 | 0.065 | 0.045 | 0.020 | 70% |
| 6 | 1.700 | 1.570 | 0.065 | 0.030 | 0.035 | 45% |
| 7 | 1.700 | 1.570 | 0.065 | 0.020 | 0.045 | 30% |

Referring to Table 2, the groove depth to wall thickness can vary between approximately 30% to approximately 50%, and preferably 30% to 50%. The groove dimensions listed do not significantly affect the structural integrity of the casings. Also, the listed groove dimensions do not adversely effect the plant development which is growing over time.

Also, the grooves can be made by perforations, punch-outs and/or a line or lines of through-holes in the wall to function similar to the longitudinal grooves.

During experimentation, the above groove dimensions have allowed for two to three times faster growth of the plants as compared to plants that are mounted in cylinders or encasements with no interior or exterior grooves.

The grooves allow for the encasement to potentially fracture along the grooves down the road allowing for easy and safe removal of the resultant encasement slivers. All previous versions of encasements without grooves have often resulted in damage to the trees if the encasement devices are attempted to be removed. Encasement devices without the grooves can become embedded with the plant walls, where removal can damage and destroy the plants. With the subject invention, encasement materials such as PVC can be easily removed without effecting the environment. The invention allows for a temporary structure to be placed in the environment and be safely and easily removed when the encasement devices fractures along the grooves. The fracturing can allow for the planter to easily and safely pull out the individual fractured pieces without destroying or damaging the plant. As previously described, groove shapes can be rectangular in cross sectional shape, oval, or triangular, or other geometric shapes and curves.

While the invention describes combining slits with grooves, the invention can be practiced only using grooves without a separate slit. For example, one longitudinal groove can be extra thin so that the growing plant will split the extra thin groove accordingly.

Although the invention describes embodiments of interior longitudinal grooves, the invention can be practiced with grooves running down the outer surfaces of the encasement device.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of planting and growing mangrove propagules or seedlings comprising the steps of:
   providing an elongated shell casing with an upper end and a lower end, and a through opening therebetween;
   providing at least one longitudinal groove along an interior wall of the shell casing formed between the upper end and the lower end, the groove having a depth less than a thickness of the wall of the elongated shell casing;

tamping and inserting the lower end of the elongated shell casing into a bottom sediment of a shore line to anchor and stabilize the encasement device in position;

establishing a planting elevation of a mangrove propagule or seedling inside of the elongated casing to an approximately mean-high water level; and hingedly expanding the elongated shell casing along the at least one longitudinal groove without splitting the elongated shell casing at the groove while the mangrove propagule or seedling grows into the plant.

2. The method of claim 1, further comprising the step of:
inserting an artificial bottom or sediment fill within the elongated shell casing is to establish preferred elevation and enable forced adaptation.

3. The method of claim 1, further comprising the step of:
providing at least one through-hole opening through the wall of the elongated shell casing; and
extending a root system of the plant outside the elongated shell casing into the external environment.

4. The method of claim 1, further comprising the steps of:
providing pigmentation in exterior walls of the elongated shell casing; and
controlling color and opacity as-well-as intensity and spectrum of solar radiation, including visible and ultraviolet light, reaching the plant through the body wall of the elongated shell casing.

5. The method of claim 1, further including the steps of:
providing an elongated slit formed in the elongated shell casing between the upper end and the lower end, the elongated slit forming opposing slit wall edges contiguous to each other;
providing two longitudinal grooves along the interior wall of the elongated shell casing to be substantially parallel to one another, and approximately 120 degrees apart from one another; and
hingedly expanding the elongated shell casing along the longitudinal grooves without splitting the elongated shell casing at the grooves while the mangrove propagule or seedling grows into the plant.

6. The method of claim 1, wherein the at least one longitudinal groove is approximately 30% to approximately 50% groove depth to wall thickness.

7. The method of claim 1, further comprising the steps of:
fracturing the at least one longitudinal groove after the mangrove propagule or seedling grows into the plant; and
removing fractured pieces of the elongated shell safely and easily without destroying or harming the plant.

8. A method of planting and growing mangrove propagules or seedlings comprising the steps of:
providing an elongated shell casing with an upper end and a lower end, and a through opening therebetween;
providing an elongated slit formed in the elongated shell casing between the upper end and the lower end, the elongated slit forming opposing slit wall edges contiguous to each other;
providing at least one longitudinal groove along an interior wall of the shell casing formed between the upper end and the lower end, the groove having a depth less than a thickness of the wall of the elongated shell casing;
hingedly expanding the elongated shell casing along the at least one longitudinal groove without splitting the elongated shell casing at the groove, and splitting the elongated shell at the elongated slit, while the mangrove propagule or seedling grows into the plant.

9. The method of claim 8, further comprising the step of:
inserting an artificial bottom or sediment fill within the elongated shell casing is to establish preferred elevation and enable forced adaptation.

10. The method of claim 8, further comprising the step of:
providing at least one through-hole opening through the wall of the elongated shell casing; and
extending a root system of the plant outside the elongated shell casing into the external environment.

11. The method of claim 8, further comprising the steps of:
providing pigmentation in exterior walls of the elongated shell casing; and
controlling color and opacity as-well-as intensity and spectrum of solar radiation, including visible and ultraviolet light, reaching the plant through the body wall of the elongated shell casing.

12. The method of claim 8, further including the steps of:
providing an elongated slit formed in the elongated shell casing between the upper end and the lower end, the elongated slit forming opposing slit wall edges contiguous to each other;
providing two longitudinal grooves along the interior wall of the elongated shell casing to be substantially parallel to one another, and approximately 120 degrees apart from one another; and
hingedly expanding the elongated shell casing along the longitudinal grooves without splitting the elongated shell casing at the grooves while the mangrove propagule or seedling grows into the plant.

13. The method of claim 8, wherein the at least one longitudinal groove is approximately 30% to approximately 50% groove depth to wall thickness.

14. The method of claim 8, further comprising the steps of:
fracturing the at least one longitudinal groove after the mangrove propagule or seedling grows into the plant; and
removing fractured pieces of the elongated shell safely and easily without destroying or harming the plant.

* * * * *